United States Patent
Shany et al.

(10) Patent No.: US 9,231,682 B2
(45) Date of Patent: *Jan. 5, 2016

(54) METHOD FOR SINGLE STREAM BEAMFORMING WITH MIXED POWER CONSTRAINTS

(71) Applicant: Celeno Communications Ltd., Ra'anana (IL)

(72) Inventors: Yaron Shany, Kfar Saba (IL); Nir Shapira, Ra'anana (IL)

(73) Assignee: Celeno Communications Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/306,270

(22) Filed: Jun. 17, 2014

(65) Prior Publication Data

US 2014/0294113 A1    Oct. 2, 2014

Related U.S. Application Data

(63) Continuation of application No. 13/655,235, filed on Oct. 18, 2012, now Pat. No. 8,768,272, which is a continuation of application No. 13/036,641, filed on Feb. 28, 2011, now Pat. No. 8,301,089.

(60) Provisional application No. 61/308,958, filed on Feb. 28, 2010.

(51) Int. Cl.
| | | |
|---|---|---|
| H04B 1/04 | (2006.01) | |
| H04B 7/06 | (2006.01) | |
| H01Q 3/26 | (2006.01) | |
| H04W 52/42 | (2009.01) | |
| H04W 52/30 | (2009.01) | |
| H04B 7/08 | (2006.01) | |
| H04W 52/36 | (2009.01) | |

(52) U.S. Cl.
CPC .............. *H04B 7/0617* (2013.01); *H01Q 3/26* (2013.01); *H04B 7/0691* (2013.01); *H04W 52/30* (2013.01); *H04W 52/42* (2013.01); *H04B 7/0857* (2013.01); *H04W 52/367* (2013.01); *Y02B 60/50* (2013.01)

(58) Field of Classification Search
CPC .. H04B 7/0617; H04B 7/0691; H04B 7/0857; H04W 52/42; H04W 52/367
USPC ................ 455/103, 39, 101, 562.1, 522, 500
See application file for complete search history.

(56) References Cited

U.S. PATENT DOCUMENTS 8,768,272 B2 *   7/2014   Shany et al. ................. 455/103

\* cited by examiner

*Primary Examiner* — Sanh Phu
(74) *Attorney, Agent, or Firm* — Pearl Cohen Zedek Latzer Baratz LLP

(57) ABSTRACT

System and method for calculating a transmitter beamforming vector related to a channel vector h under per-antenna power constraints combined with total power constraint, under per-antenna power constraints combined with overall line of site (LOS) effective isotropic radiated power (EIRP) and under all three constraints. Calculating a transmitter beamforming vector may be done in the transmitter, in the receiver and feedback to the transmitter or in both. The method may be adapted to perform with a multi-antenna receiver and with multi-carrier systems.

26 Claims, 11 Drawing Sheets

METHOD FOR SINGLE STREAM BEAMFORMING WITH MIXED POWER CONSTRAINTS

CROSS REFERENCE TO RELATED APPLICATIONS

This application is a continuation of U.S. patent application Ser. No. 13/655,235, filed on Oct. 18, 2012, entitled METHOD FOR SINGLE STREAM BEAMFORMING WITH MIXED POWER CONSTRAINTS, which is a continuation of U.S. patent application Ser. No. 13/036,641, filed on Feb. 28, 2011, entitled METHOD FOR SINGLE STREAM BEAMFORMING WITH MIXED POWER CONSTRAINTS, now U.S. Pat. No. 8,301,089, which in turn claims the benefit of U.S. Provisional Application Ser. No. 61/308,958, filed on Feb. 28, 2010 and entitled SINGLE STREAM BEAMFORMING WITH MIXED POWER CONSTRAINTS, the entire contents of each of which are incorporated herein by reference.

FIELD OF THE INVENTION

The present invention relates to the field of wireless communication. In particular, embodiments of the present invention relate to a method for single stream beamforming with mixed power constrains.

BACKGROUND OF THE INVENTION

In a communication system with a multi-antenna transmitter and, for example, a single-antenna receiver, the transmitter may have an estimate of the channel between each of its antennas and the receiver antenna. Alternatively, in case of multi antenna receiver the transmitter can assume a receiver beamforming vector that emulates a single effective antenna. To optimize the signal-to-noise ratio (SNR) at the receiver, the transmitter should appropriately design the TX beamforming vector, that is, the vector of complex coefficients that multiply the single data symbol before sending it for transmission in each antenna.

The designed beamforming vector is subject to physical and regulatory constraints. The physical constraints may include a limitation on the TX power of each power amplifier (PA), a limitation on the overall TX power due to packaging and thermal constraints, etc. The regulatory constraints include any limitation imposed by a regulator, such as FCC or ETSI. Typically, regulatory constraints include limitations on the overall line of site (LOS) effective isotropic radiated power (EIRP) and the overall TX power.

Thus, practical beamforming design problem is typically subject to three types of constraints: per radio-frequency (RF) chain constraints, also referred to as Per-antenna power constraints, an overall power constraint, and an EIRP constraint. Therefore, it is desirable to have an efficient method to design a beamforming vector that satisfies all constraints while substantially maximizing SNR.

Additionally practical beamforming design problem may be subject to a subset of two constraints. For example, ETSI standard enforces only EIRP constraint. However, per-antenna power constraint may arise from physical limitation of the practical communication system. Thus, a practical communication system that conforms to ETSI standard may require a beamforming design under per-antenna power constraints and EIRP constraint. Moreover, in many practical situations, satisfying one constraint does not guarantee conforming to the other constraint. For example, in the 5470-5725 MHz band, the EIRP limitation of ETSI is 1 W. For a system with 4 isotropic antennas and with 100 mW power amplifiers, satisfying only the per-antenna constraints does not guarantee satisfying the EIRP constraint, because if all 4 antennas transmit in full power, the EIRP might be as high as $4^2 \cdot 0.1 = 1.6$ W. In addition, satisfying only the EIRP constraint does not guarantee satisfying the per-antenna constraints, as transmitting from a single antenna in 1 W satisfies the EIRP constraint but not the per-antenna constraints. Thus, a beamforming design under the per-antenna power constraints and an EIRP constraint is needed.

According to the following scenario, beamforming design problem may be subject to per-antenna and the overall power constraints. In FCC both the EIRP and the overall power are limited, and the limit on the EIRP is 6 dB higher than the limit on the total power. For a system with 3 isotropic antennas, satisfying the total power constraint assures that the EIRP constraint is satisfied. Hence, it follows that the only effective regulatory constraint is the total power constraint. Writing P for the total power constraint, if the maximum allowed per-antenna power levels are in the interval (P/3, P), both the per-antenna and the overall power constraints should be considered. Thus, a beamforming design under per-antenna and overall power constraints is needed.

The following example presents a case where all three types of constraints should be accounted for. Consider transmission in the 5.25 GHz-5.35 GHz sub-band under FCC regulations. In this sub-band, FCC requires that total TX power is below 24 dBm, and that EIRP is below 30 dBm. Suppose that the maximum output power of each power amplifier of the transmitter is 22 dBm, and that the transmitter has 4 antennas, each with a gain of 1.5 dBi. Here, satisfying two constraints does not assure that the third constraint is also satisfied. Hence a beamforming design under all three constraint types is needed.

Unfortunately, existing methods are either far from optimum or too complicated for real time software implementation. On the one side of the scale, there are methods that start with well-known solutions to a single type of constraint, and then scale down the entire beamforming vector to meet the other constraints. On the other side of the scale, there are convex optimization methods that are very complicated both computationally and conceptually.

In detail, when the only limitation is on the total power, it is well known in the art that the optimum transmit beamforming vector is the maximum ratio combining (MRC) vector related to the channel vector and the maximum allowed power. Also, if only the per-antenna powers are constrained, then an optimum beamforming vector is obtained by using all available power of each antenna, while choosing phases that assure coherent addition at the receiver. Such a beamforming vector will be referred to as a full per-antenna power (FPAP) vector throughout this application.

In a communication system with multi antenna receivers the equivalent of an MRC vector is typically computed using the singular value decomposition (SVD) of the channel matrix. The first column of the transmit matrix V, obtained from the SVD, corresponding to the largest singular value of the channel, is the transmit MRC vector to the best RX effective antenna. According to IEEE 802.11n/ac explicit matrix feedback, the receiver usually returns the V matrix to the transmitter.

A simple, yet suboptimum, method for finding the beamforming vector in case of multiple constraints is to start by considering only the total power or the per-antenna power constraints, and then to scale the resulting MRC or FPAP vector in order to satisfy the other constraints. While simple, this method, referred to as the scaling method throughout this application, is typically quite far from optimal.

Alternatively, it is possible to aim at the true optimum of the beamforming design problem, at the cost of considerably higher complexity. Since this problem is a convex optimization problem, existing convex optimizations algorithms can be used to solve it. While such algorithms have time complexity that is polynomial in the number of variables, they are still considerably more complicated than the above MRC/FPAP+scaling solutions.

SUMMARY OF THE INVENTION

According to embodiments of the present invention, there is provided a method for calculating a transmitter beamforming vector related to a channel vector h under per-antenna power constraints combined with total power constraint. The method may include assigning full power to antennas pertaining to a subset S, and calculating maximum ratio combining (MRC) beamforming vector related to a sub-channel vector excluding said subset S, with a maximum allowed power constraint equal to the total power constraint minus power of said subset, wherein the transmitter beamforming vector b(h; P,p) amplitude is composed from square root of the per-antenna power constrains for said subset S and said MRC beamforming vector on remaining components.

Furthermore, according to embodiments of the present invention, the method may include setting phases of the transmitter beamforming vector to equal minus phases of a corresponding channel vector.

Furthermore, according to embodiments of the present invention, the method may include finding said subset S, wherein finding said subset S may include: ordering ratios $h_k^2/p_k$ in descending order such that:

$$\frac{h_{\tau(1)}^2}{p_{\tau(1)}} \geq \frac{h_{\tau(2)}^2}{p_{\tau(2)}} \geq \ldots \geq \frac{h_{\tau(N)}^2}{p_{\tau(N)}},$$

where $h_k$ are absolute values of components of the channel vector, $p_k$ are components of the per-antenna power constraints vector, N is number of channels and $\tau$ is a permutation on $\{1, \ldots, N\}$, and finding a minimum index k such that:

$$\frac{h_{\tau(k+1)}^2}{p_{\tau(k+1)}} \leq threshold(k)$$

where $$threshold(k) := \frac{\sum_{j=k+1}^{N} h_{\tau(j)}^2}{P - \sum_{j=1}^{k} p_{\tau(j)}}$$

where P is the total power constraint, wherein said subset S includes $S = \{\tau(1), \tau(2), \ldots, \tau(k)\}$.

Furthermore, according to embodiments of the present invention, wherein the transmitter beamforming vector b(h; P,p) amplitudes may be:

$$\{b(h; P, p)\}_{\tau(i)} = \begin{cases} \sqrt{p_{\tau(i)}} & i \in \{1, \ldots, k\} \\ h_{\tau(i)} \cdot \sqrt{\dfrac{P - \sum_{j=1}^{k} p_{\tau(j)}}{\sum_{j=k+1}^{N} h_{\tau(j)}^2}} & i \in \{k+1, \ldots, N\} \end{cases}$$

Furthermore, according to embodiments of the present invention, the method may include:
a. finding said subset S, wherein finding said subset of full power antennas may include calculating a full MRC beamforming vector related to the channel vector with the total power constraint;
b. replacing components of the full MRC beamforming vector in which the per-antenna constraints are violated with square root of the corresponding per-antenna constraints;
c. calculating partial MRC vector related to remaining components with the maximum allowed power constraint being a difference between the total power constraint and overall power on replaced components;
d. replacing components of the partial MRC beamforming vector in which the per-antenna constraints are violated with square root of the corresponding per-antenna constraints;
e. repeating steps c and d until the per-antenna power constraints are met.

Furthermore, according to embodiments of the present invention, the method may include finding a flooding level for which a beamforming vector of flooded channel vector satisfies an EIRP constraint, wherein the flooded channel vector is derived by subtracting said flooding level from components of the channel vector that are larger than said flooding level while reducing to zero components of the channel vector that are not larger than said flooding level.

Furthermore, according to embodiments of the present invention, the EIRP constraint is given by: $|\Sigma_{k=1}^{N}|b_k||^2 \geq E$, where $b_k$ is the beamforming vector.

Furthermore, according to embodiments of the present invention, the beamforming vector $b_{per-ant.+tot.power}((h-\lambda)^+; P,p)$ of flooded channel vector $(h-\lambda)^+$ may satisfy said EIRP constraint according to: $|\{\Sigma_{k=1}^{N}[b_{per-ant.+tot.power}((h-\lambda)^+; P, p)]_k\} - \sqrt{E}| < \epsilon$, where $\epsilon$ is an allowed error.

Furthermore, according to embodiments of the present invention, the method may be adapted to be performed with a multi-antenna receiver, and may further include assuming a receiver beamforming vector, or obtaining an effective single-RX-antenna channel by an explicit beamforming feedback from a receiver.

Furthermore, according to embodiments of the present invention, the method may be adapted to be performed with a multi-antenna receiver, and may further include:
a. calculating an estimate of receiver beamforming vector based on said transmitter beamforming vector;
b. getting a new effective channel vector, based on said estimate of receiver beamforming vector;
c. calculating a second step transmitter beamforming vector based on said new effective channel vector; and
d. repeating steps a to c until a stopping criterion is met.

Furthermore, according to embodiments of the present invention, the method may be adapted to be performed with a multi-antenna receiver, and may further include:
a. sending a sounding frame to said multi-antenna receiver, said sounding frame comprising said transmitter beamforming vector;

b. receiving a feedback matrix from said multi-antenna receiver, said feedback matrix comprising a new effective channel vector;
c. calculating an updated transmitter beamforming vector based on said new effective channel vector;
d. sending said sounding frame to said multi-antenna receiver, said sounding frame comprising said updated transmitter beamforming vector; and
e. repeating steps b-d until a stopping criterion is met.

Furthermore, according to embodiments of the present invention, the method may be adapted to be performed with a multi-carrier system, and may further include: dividing said per-antenna power constraints and said total power constraint between subcarriers; and calculating said transmitter beamforming vector for each said subcarriers.

Furthermore, according to embodiments of the present invention, the method may be adapted to be performed with a multi-carrier systems, and may further include: averaging per-subcarrier channel magnitudes for each antenna to get a vector of averages, using said vector of averages as said channel vector; and setting magnitudes of per-subcarrier beamforming vectors to equal the absolute value of said transmitter beamforming vector divided by the square-root of the total number of subcarriers.

Furthermore, according to embodiments of the present invention, the method may include setting phases of said per-subcarrier beamforming vectors to minus corresponding channel phase.

Furthermore, according to embodiments of the present invention, the method may include obtaining initial beamforming vectors, calculating the power $\tilde{p}_i$ of antenna i resulting from initial beamforming vectors, for all i, calculating said transmitter beamforming vectors with an effective input channel magnitude vector being equal to $\{\sqrt{\tilde{p}_i}\}$, and scaling the initial beamforming vectors by $b_i/\sqrt{\tilde{p}_i}$ for all antenna index i.

Furthermore, according to embodiments of the present invention, the method may include obtaining initial beamforming vectors for each said subcarrier, summing power levels over all said subcarriers for all i, to get power $\tilde{p}_i$ of said antenna i resulting from said initial beamforming vectors, and multiplying by $b_i/\sqrt{\tilde{p}_i}$ the i-th component of said initial beamforming vectors of said subcarrier s for all said subcarrier s and for all said antenna i.

Furthermore, according to embodiments of the present invention, the method may include obtaining corresponding SNR-estimation, $SNR_{old}$, and calculating an estimation of $SNR_{new}$ according to:

$$\sqrt{\frac{SNR_{new}}{SNR_{old}}} = \frac{\sum_i b_i \cdot \sqrt{\tilde{p}_i}}{\sum_i \tilde{p}_i}.$$

Furthermore, according to embodiments of the present invention, calculation of said transmitter beamforming vector may be performed by a transmitter.

Furthermore, according to embodiments of the present invention, calculation of said transmitter beamforming vector is performed by a receiver and fed back to a transmitter.

Furthermore, according to embodiments of the present invention, the method may include obtaining an initial beamforming vector b at a transmitter from a receiver, and setting said channel vector h to be a complex conjugate of said initial beamforming vector b, and setting phases of the transmitter beamforming vector to equal the phases of said initial beamforming vector b.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
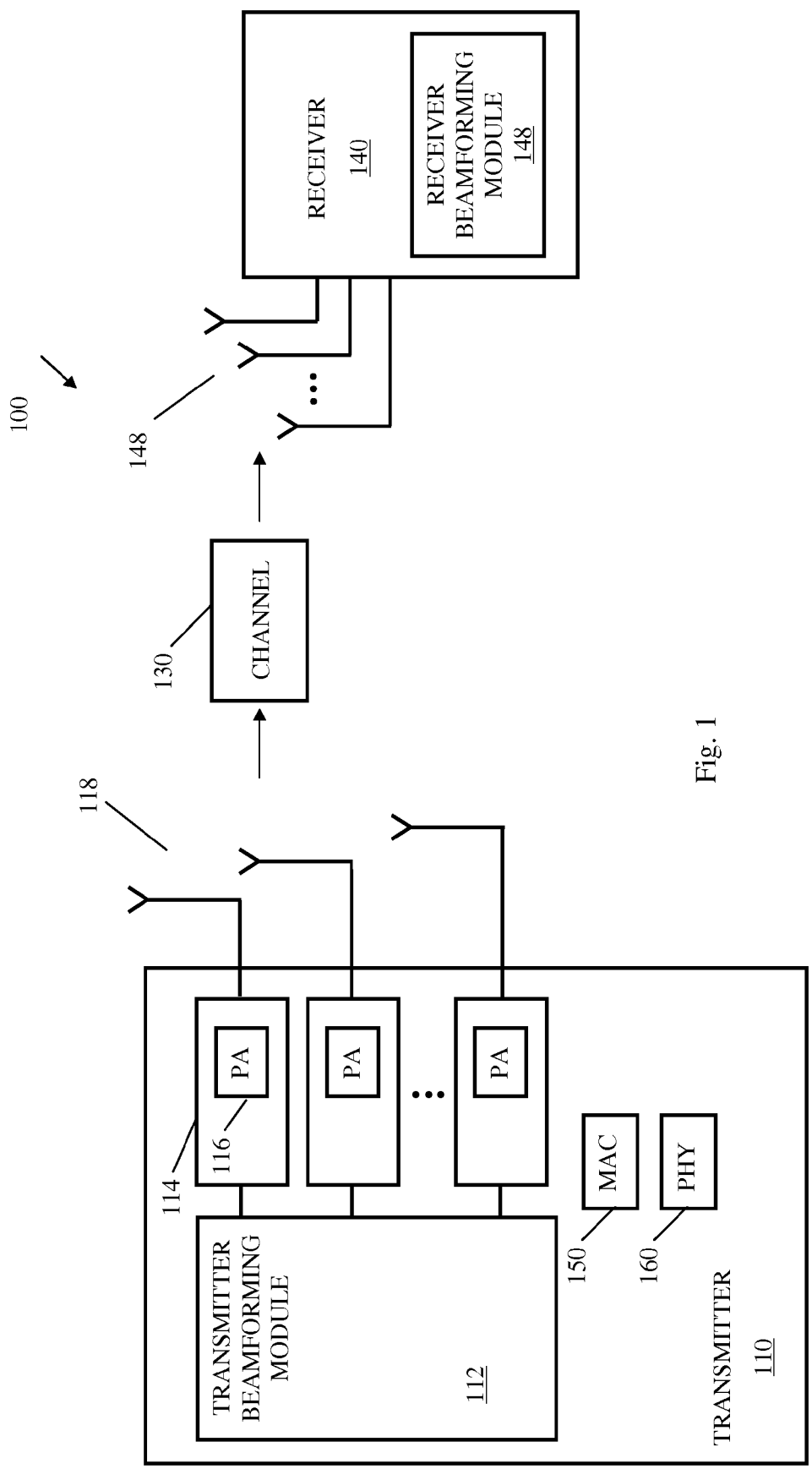
FIG. 1 is a schematic illustration of a wireless communication system in accordance with a demonstrative embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining","establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

Stations intended to be included within the scope of the present invention include, by way of example only, wireless local area network (WLAN) stations, wireless personal area network (WPAN) stations, two-way radio stations, digital system stations, analog system stations, cellular radiotelephone stations, and the like.

Types of WLAN communication systems intended to be within the scope of the present invention include, although are not limited to, "IEEE-Std 802.11, 1999 Edition (ISO/IEC 8802-11: 1999)" standard, and more particularly in "IEEE-Std 802.11b-1999 Supplement to 802.11-1999, Wireless LAN MAC and PHY specifications: Higher speed Physical Layer (PHY) extension in the 2.4 GHz band", "IEEE-Std 802.11a-1999, Higher speed Physical Layer (PHY) extension in the 5 GHz band" standard, "IEEE Std 802.11n-2009," IEEE 802.11ac standard (e.g., as described in "IEEE 802.11-09/0992r21") and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal Frequency-Division Multiplexing (OFDM) and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a local area network (LAN), a wide area network (WAN), or a global communication network, for example, the Internet.

Reference is made to FIG. 1, which schematically illustrates a wireless communication system 100 in accordance with demonstrative embodiments of the present invention. It will be appreciated by those skilled in the art that the simplified components schematically illustrated in FIG. 1 are intended for demonstration purposes only, and that other components may be required for operation of the wireless devices. Those of skill in the art will further note that the connection between components in a wireless device need not necessarily be exactly as depicted in the schematic diagram.

Although the scope of the present invention is not limited to this example, wireless communication system 100 may include a transmitter 110 transmitting data to receiver 140 through wireless communication channel 130. Transmitter 110 may include, for example an access point able to transmit and/or receive wireless communication signals, and receiver 140 may include, for example, a wireless communication station or a wireless communication device able to transmit and/or receive wireless communication signals. It should be noted that while transmitter 110 and receiver 140 are presented with relation to the main data transmission direction in a given session, both stations may have transition and reception capabilities.

According to embodiments of the present invention, transmitter 110 may include a transmitter beamforming module 112 connected to a plurality of RF front end modules 114, which may be connected to a plurality of antennas 118. Each RF front end module 114 may include a power amplifier (PA) 116, and may be connected to one antenna 118. Transmitter beamforming module 112 may calculate a beamforming vector to control signal to antennas 118 and may scale the gain of all PAs 116. Additionally, transmitter 110 may include Media Access Controller (MAC) module 150 and a Physical Layer module (PHY) 160. Receiver 140 may include a receiver beamforming module 142 and a plurality of antennas 148. Receiver beamforming module 142 may calculate a beamforming vector and send the beamforming vector to transmitter 110, for example by sending explicit beamforming feedback from the receiver 140, such as in the case of IEEE 802.11n/ac explicit matrix feedback.

Although the invention is not limited in this respect, antennas 118, 148 may include, for example, a set of N antennas. Antennas 118, 148 may include, for example, an internal and/or external RF antenna, e.g., a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, modules, frames, transmission streams, packets, messages and/or data.

According to embodiments of the present invention transmitter beamforming module 112 and receiver beamforming module 142 may be adapted to perform beamforming design under per-antenna powers, overall power, and overall EIRP constraints, as will be discussed in detail below. Transmitter beamforming module 112 and receiver beamforming module 148 may be implemented using any suitable combination of memory, hardwired logic, and/or general-purpose or special-purpose processors, as is known in the art. In accordance with different demonstrative embodiments of the invention, transmitter beamforming module 112 may be implemented as a separate entity or as subsystem of either MAC module 150 and/or PHY module 160.

According to embodiments of the present invention, the calculation of beamforming vector or vectors as will be discussed in detail infra may be performed in the transmitter side, for example, in transmitter beamforming module 112.

Alternatively, the calculation of beamforming vector or vectors may be performed in the receiver side, for example, in receiver beamforming module 142. In such case the beamforming vector may be sent to transmitter 110, for example by sending explicit beamforming feedback from the receiver 140, such as in the case of IEEE 802.11n/ac explicit matrix feedback. Transmitter 110 may use the feedback as is, or alternatively, perform beamforming calculations on top of the vector received from receiver 140, such that both sides may calculate beamforming vectors according to embodiments of the invention, and may use for the calculations the same method or two different methods.

The problem of beamforming design may be presented as follows: Suppose that transmitter 110 has N antennas. The receiver may be a single antenna receiver or may be a multi antenna receiver that may be considered as heaving a single equivalent antenna, as described in detail infra. Given the complex-baseband channel vector, also referred to as channel vector throughout the application, $\tilde{h}=(\tilde{h}_1, \ldots, \tilde{h}_N)^T \in C^N$, the per-antenna-power constraint vector $p=(p_1, \ldots, p_N) \in R_{++}^N$ the total power constraint $P \in R_{++}$, and the EIRP constraint E, a beamforming vector $\tilde{b}=(\tilde{b}_1, \ldots, \tilde{b}_N)^T \in C^N$ that maximizes $|\tilde{b}^T\tilde{h}|^2$ while satisfying various combinations of the total power constraint $\Sigma_{k=1}^N |\tilde{b}_k|^2 \leq P$, the per-antenna power constraint $|\tilde{b}_k|^2 \leq p_k$ for all $k \in \{1, \ldots, N\}$, and the EIRP constraint has to be found. $p_k$ are components of power constraint vector. A mathematical description of the EIRP constraint is deferred to Equation 13 ahead.

Alternatively, transmitter 110 may obtain a beamforming vector from receiver 140, also referred to as initial beamforming vector, and may not have direct knowledge of channel h, for example, as in the case of explicit BF. If transmitter 110 obtains an initial beamforming vector from receiver 140, the initial beamforming vector may be scaled, and the channel h may be set to be a complex conjugate of b.

It should be noted that in practice different RF chains may have different power limitations. For example, when each RF chain is calibrated separately to achieve a desired error vector magnitude (EVM) or when there is a separate closed-loop power control for each RF chain. Therefore, a per-antenna power constraint vector is given, rather than just a single scalar suitable to all antennas.

Figure 2:
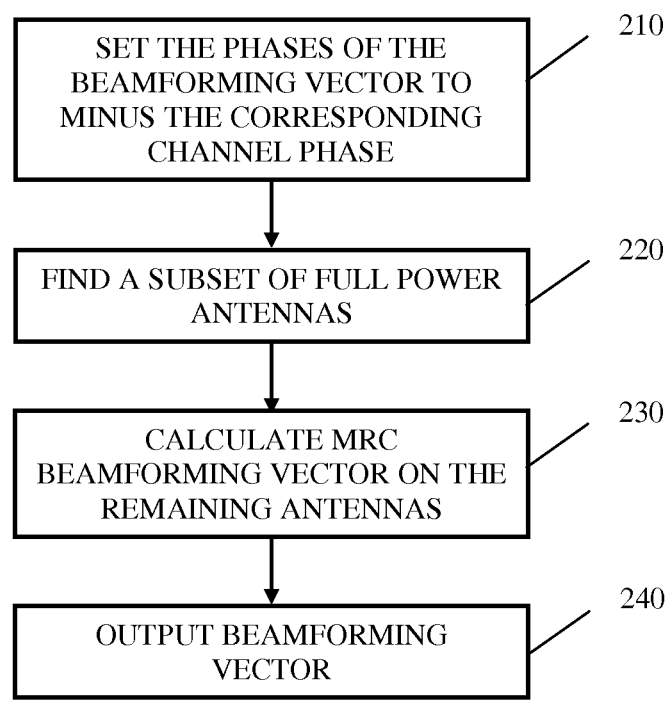
FIG. 2 is a flowchart illustration of a method for calculating beamforming vector under per-antenna constraints combined with total power constraint according to embodiments of the present invention.

Reference is now made to FIG. 2 which is a flowchart illustration of a method for calculating beamforming vector under per-antenna constraints combined with total power constraint according to embodiments of the present invention. According to embodiments of the present invention, the phases of the beamforming vector may be set to minus the corresponding channel vector phases, as indicated in block 210:

$$\arg(\tilde{b}_k) = -\arg(\tilde{h}_k), \quad (1)$$

for all $k \in \{1, \ldots, N\}$. Alternatively, if transmitter 110 obtains an initial beamforming vector from receiver 140, then the original phases of the initial beamforming vector may be left unchanged. Letting $b_k := |\tilde{b}_k|$ be the absolute value of the k-th component of the beamforming vector $\tilde{b}$ and $h_k := |\tilde{h}_k|$ be the absolute value of the k-th component of the channel vector $\tilde{h}$ for all k, the problem of beamforming under a total and per-antenna power constraints reduces to the maximization of $b^T h$ subject to $\Sigma_{k=1}^N b_k^2 \leq P$ and $b_k^2 \leq p_k$ for all k. After finding real values of the beamforming vector $b_k$ each entry of the beamforming vector $b_k$ may be multiplied by the minus the corresponding channel phase, to form the final beamforming vector. It should be readily understood by those skilled in the art that the above formulation does not require that b is positive, as this will be an immediate outcome of the optimization.

According to embodiments of the present invention the optimum b has the following shape: There is a subset $S \subseteq \{1, \ldots, N\}$ of full power antennas, that is, $k \in S \Rightarrow b_k^2 = p_k$, and the remaining antennas of the complementary subset use MRC on the corresponding complementary channel vector $\{h_k\}_{k \notin S}$, with the maximum allowed power being the complementary total power constraint that may equal the total power constraint minus the sum power on the subset S of full power antennas, $P - \Sigma_{k \in S} p_k$, as in equation (2) infra. At block 220 a subset of full power antennas may be found and at block 230 MRC vector may be calculated for the remaining antennas. At block 240 the resultant beamforming vector may be output.

According to embodiments of the present invention, subset S may be found using the ratio threshold method. According to the ratio threshold method MRC beamforming vector $b_{MRC}$(h;P) corresponding to the channel vector h and the total power constraint P may be calculated. In detail, the MRC vector $b_{MRC}$(h;P) may be defined by:

$$b_{MRC}(h; P)_i = h_i \cdot \sqrt{\frac{P}{\sum_{j=1}^{N} h_j^2}}, \; i \in \{1, \ldots, N\}, \quad (2)$$

If the MRC vector fulfils the per-antenna constrains for each antenna:

$$[b_{MRC}(h;P)]_i^2 \leq p_i \text{ for all } i \in \{1, \ldots, N\} \quad (3)$$

then the MRC vector, $b_{MRC}$(h;P), may be the beamforming vector. Alternatively, MRC vector may not be calculated at this point. Further according to the ratio threshold method the ratio $h_k^2/p_k$ may be ordered in descending order. Let $\tau$ be a permutation on $\{1, \ldots, N\}$ such that $$\frac{h_{\tau(1)}^2}{p_{\tau(1)}} \geq \frac{h_{\tau(2)}^2}{p_{\tau(2)}} \geq \ldots \geq \frac{h_{\tau(N)}^2}{p_{\tau(N)}} \quad (4)$$

A substantially minimum index k may be found such that $$\frac{h_{\tau(k+1)}^2}{p_{\tau(k+1)}} \leq \text{threshold}(k), \quad (5)$$

where $$\text{threshold}(k) := \frac{\sum_{j=k+1}^{N} h_{\tau(j)}^2}{P - \sum_{j=1}^{k} p_{\tau(j)}} \quad (6)$$

k may start running from 1 in case MRC vector $b_{MRC}$(h;P) was calculated or from 0, in case MRC vector $b_{MRC}$(h;P) was not calculated. It should be noted that there may be no need to find permutation $\tau$; permutation $\tau$ is only presented here for clarity of the mathematical presentation. In practical applications vector of the ratios $h_k^2/p_k$ may be sorted.

Subset S may include:

$$S = \{\tau(1), \tau(2), \ldots, \tau(k)\}, \quad (7)$$

and the beamforming vector may be composed from full per-antenna power components on S, and with MRC with the remaining power on the complementary subset $\{1, \ldots, N\} \backslash S$. In detail, the beamforming vector b(h;P,p) may be composed from the square root of the per-antenna constrains for subset S and MRC on the antennas of the complementary subset:

$$\{b(h; P, p)\}_{\tau(i)} = \begin{cases} \sqrt{p_{\tau(i)}} & i \in \{1, \ldots, k\} \\ h_{\tau(i)} \cdot \sqrt{\dfrac{P - \sum_{j=1}^{k} p_{\tau(j)}}{\sum_{j=k+1}^{N} h_{\tau(j)}^2}} & i \in \{k+1, \ldots, N\} \end{cases}, \quad (8)$$

It should be noted that a threshold level k as presented in equations (5) and (6) may ensure that the MRC vector for the antennas with indices in $\{1, \ldots, N\}\backslash S$:

$$b_{MRC}((h_{\tau(k+1)}, h_{\tau(k+2)}, \ldots, h_{\tau(N)})^T; P - \Sigma_{j=1}^k p_{\tau(j)}) \quad (9)$$

may not violate the per antenna power constraints

Figure 3:
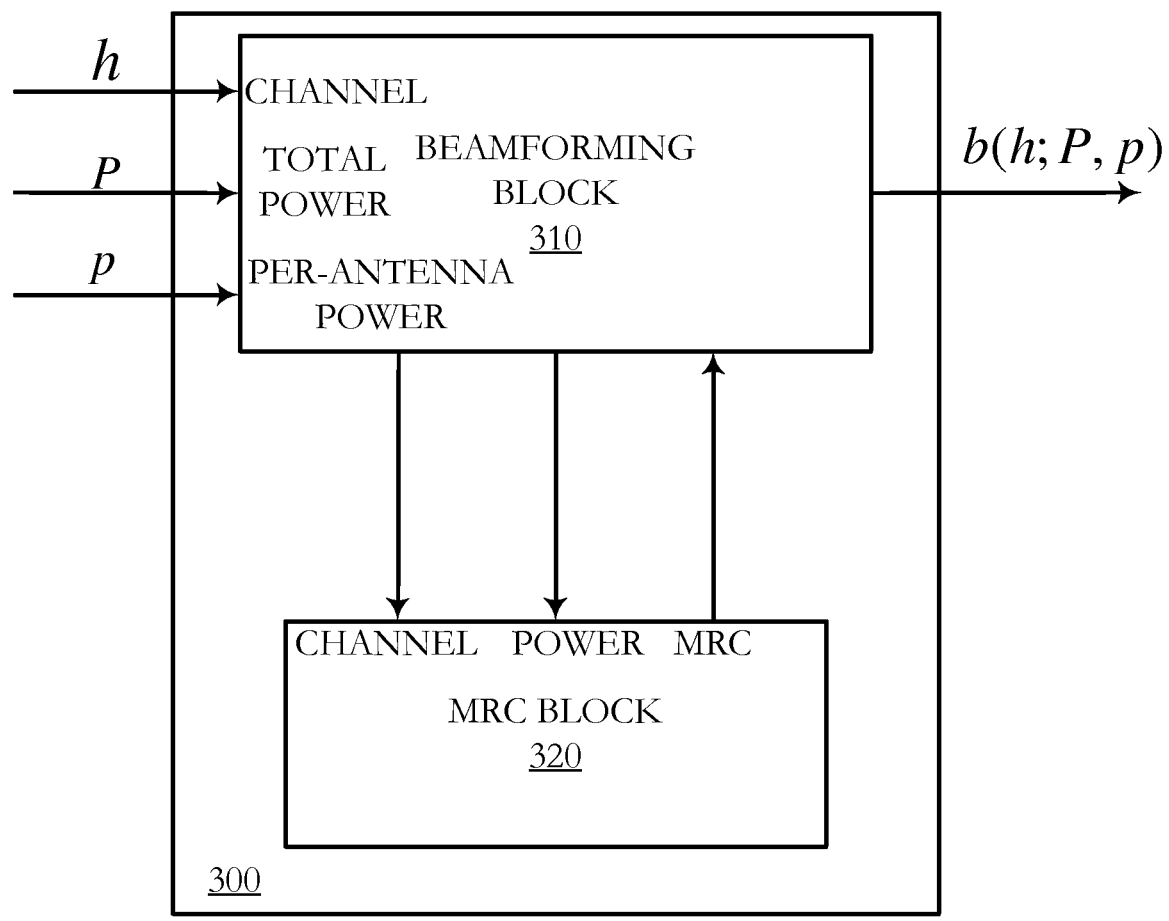
FIG. 3 is a schematic illustration of an exemplary implementation of beamforming module according to embodiments of the present invention.

Reference is made to FIG. 3, which is a schematic illustration of an exemplary implementation of beamforming module 300 according to embodiments of the present invention. According to embodiments of the present invention beamforming module 300 may include beamforming block 310 and MRC block 320. Beamforming module 300 may be implemented in transmitter 110 as transmitter beamforming module 112 or in receiver 140 as receiver beamforming module 142. Beamforming block 310 may obtain channel vector $\bar{h}$, total power constraint P, and power constraint vector p as inputs, and may calculate the vector h of absolute values and output beamforming vector b(h;P,p) multiplied by appropriate phases, for example, by minus the phases of $\bar{h}$. Alternatively, beamforming block 310 may obtain an initial beamforming vector and assume channel vector $\bar{h}$ is the conjugate of the initial beamforming vector, so that the vector of absolute values h is equal to the vector of absolute values of the initial beamforming vector.

According to embodiments of the present invention, beamforming module 112 may be adapted to perform the ratio threshold method. Beamforming block 310 may order ratios $h_k^2/p_k$ according to (4), find subset S by calculating index k according to (5) and (6), and send complementary channel vector $(h_{\tau(k+1)}, h_{\tau(k+2)}, \ldots, h_{\tau(N)})^T$, and the complementary total power constraint for the partial channel vector, $P - \Sigma_{j=1}^k p_{\tau(j)}$, to MRC block 320 such that MRC block 320 may calculate the MRC vector for the antennas with indices in $\{\tau(k+1), \tau(k+2), \ldots, \tau(N)\}$ as presented in (9). MRC block 320 may return the MRC vector for the antennas with indices in $\{\tau(k+1), \tau(k+2), \ldots, \tau(N)\}$ to beamforming block 310. Beamforming block 310 may compose beamforming vector b(h;P,p) from the per antenna constrains for subset S and MRC on the remaining subchannels of the complementary subset, according to (8).

Figure 4:
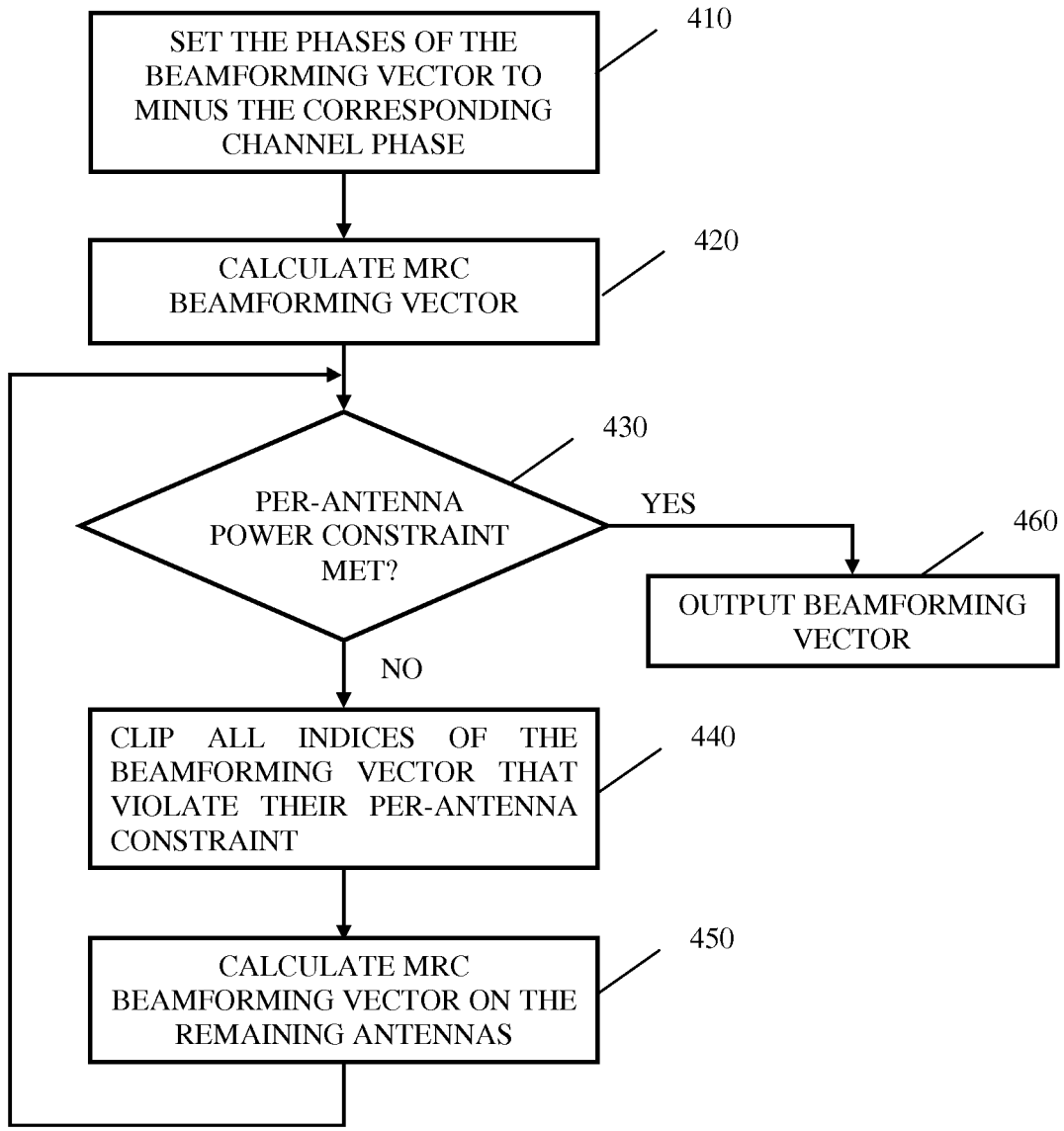
FIG. 4 which is a flowchart illustration of a method for calculating beamforming vector under per-antenna constraints combined with total power constraint according to embodiments of the present invention.

Reference is now made to FIG. 4 which is a flowchart illustration of a method for calculating beamforming vector under per-antenna constraints combined with total power constraint using the iterative MRC method according to embodiments of the present invention. In block 410 the phases of the beamforming vector may be set to minus the corresponding channel phase, as indicated in (1). Alternatively, if transmitter 110 obtains an initial beamforming vector from receiver 140, then the original phases of the initial beamforming vector may be left unchanged. Subset S may be found in an iterative process, as described hereinafter.

In block 420 a full MRC beamforming vector $b^{(0)}:=b_{MRC}(h;P)$, may be calculated taking into account the total power constraint, but not the per-antenna power constraints. The resultant full MRC beamforming vector $b^{(0)}:=b_{MRC}(h;P)$, may violate the per-antenna constraints for several antennas. In block 430 it may be verified whether the per-antenna constraints are met. If the per-antenna constraints are met, then $b^{(0)}:=b_{MRC}(h;P)$ may be the output of the iterative MRC method as indicated in block 460. If the per-antenna constraint is not met then indices of the MRC beamforming vector $b^{(0)}:=b_{MRC}(h;P)$ in which per-antenna constraint is violated may be replaced or clipped to equal the square root of per-antenna constraints at these channels, as indicated in block 440. The resultant beamforming vector $b^{(1)}$ may meet the per-antenna constraints with equality in the above components, however, the overall power of $b^{(1)}$ may be smaller than the total power constraint P. In order to use all available power, the remaining, not clipped, part of $b^{(1)}$ may be replaced by a partial MRC vector on the corresponding antennas, with the power constraint being the difference between P and the overall power on the clipped components, as indicated in block 450. Again, the MRC operation may result in violation of some per-antenna constraints. Thus blocks 430, 440 and 450 may be repeated until per antenna power constraints are met.

After a finite number r of iterations, the resultant vector $b^{(r)}$ may either meet the overall power constraint with equality, or meet all the per-antenna constraints with equality. This vector $b^{(r)}$ may be the output of the iterative MRC method, as indicated in block 460.

A beamforming vector $b_{(s)}(h;P,p)$ for a subset $S \subseteq \{1, \ldots, N\}$ with $P - \Sigma_{i \in S} p_i \geq 0$, may be defined by setting:

$$[b_{(S)}(h; P, p)]_k := \begin{cases} \sqrt{p_k} & k \in S \\ h_k \cdot \sqrt{\dfrac{P - \sum_{i \in S} p_i}{\sum_{i \notin S} h_i^2}} & k \notin S \end{cases}, \quad (10)$$

wherein k indicates indices of antennas that pertain to subset S. It should be noted that if S is an empty subset, then $b_{(s)}(h;P,p) = b_{MRC}(h;P)$, and otherwise $b_{(S)}(h;P,p)$ may be a beamforming vector with full per-antenna power on S, and with MRC with the remaining power on the remaining components of the complementary subset.

Reference is made again to FIG. 3. According to embodiments of the present invention, beamforming module 112 may be adapted to perform the iterative MRC method. Beamforming block 310 may initiate S to be empty subset and may send complementary channel vector $\{h_k\}_{k \notin S}$, and the total power constraint for the complementary channel vector, $P - \Sigma_{k \in S} p_k$, to MRC block 320 such that MRC block 320 may calculate the complementary beamforming MRC vector $b_{MRC}(\{h_k\}_{k \notin S}; P - \Sigma_{k \in S} p_k)$ and return it to beamforming block 310, which combines the subset S having full per antenna power with the complementary beamforming MRC vector $b_{MRC}(\{h_k\}_{k \notin S}; P - \Sigma_{k \in S} p_k)$ to get $b_{(S)}(h;P,p)$. If $b_{(S)}(h;P,p)$ satisfies all per-antenna constraints, beamforming block 310 may output $b_{(S)}(h;P,p)$. Otherwise, beamforming block 310 may join to subset S all indices in which $b_{(S)}(h;P,p)$ violates the per-antenna constraints, assign to them full per antenna power, and again send complementary channel vector $\{h_k\}_{k \notin S}$, and the total power constraint for the complementary channel vector, $P - \Sigma_{k \in S} p_k$, to MRC block 320 such that MRC block 320 may calculate complementary MRC vector related to k $b_{MRC}(\{h_k\}_{k \notin S}; P - \Sigma_{k \in S} p_k)$, and so forth until per antenna power constraints are met for all antennas. Beamforming block 310 may compose beamforming vector $b_{(S)}(h;P,p)$ as indicated in (10). $b_{(S)}(h;P,p)$ may be the output of beamforming block 310.

It can be shown that both ratio threshold and iterative MRC methods may reach substantially optimal results. Each of these methods may have its advantages. For example, the iterative MRC method may be simpler conceptually, and may not require sorting of ratios. The ratio threshold method, on the other hand, may not require actually calculating several MRC vectors. Hence, in some systems ratio threshold method may be preferred, while in others the iterative MRC method may be preferred.

Figure 5:
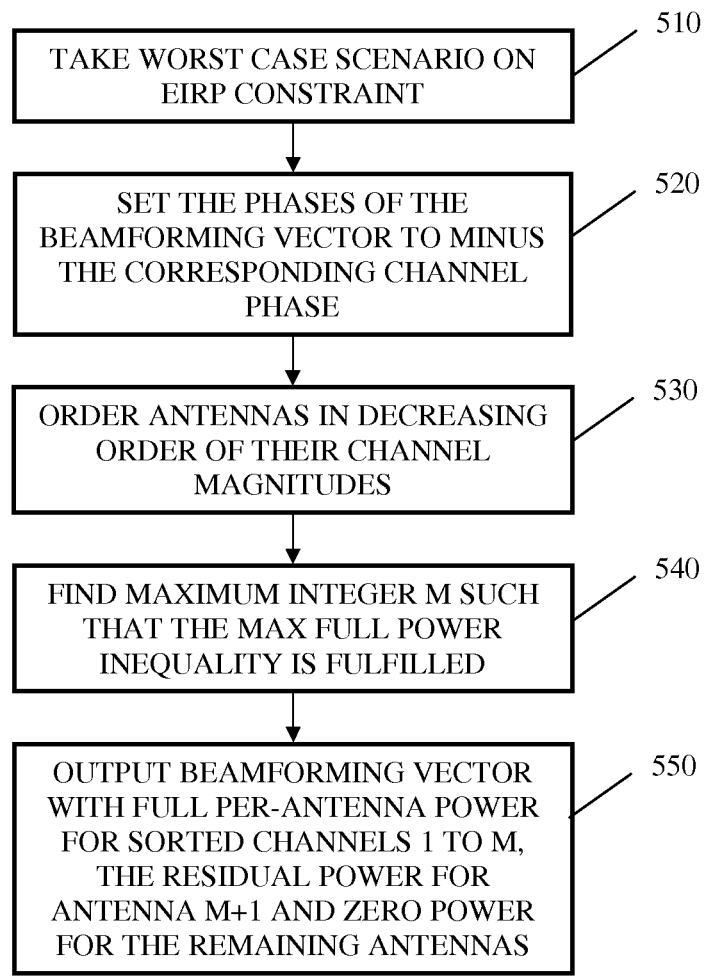
FIG. 5 is a flowchart illustration of a simplified method for calculating beamforming vector under per-antenna constraints combined with EIRP constraint according to embodiments of the present invention.

Reference is now made to FIG. 5 which is a flowchart illustration of a method for calculating beamforming vector under per-antenna constraints combined with EIRP constraint according to embodiments of the present invention. According to embodiments of the present invention, a worst-case scenario that all values of the beamforming vector add coherently may be assumed, as indicated in block 510, and hence the EIRP constraint may be defined as:

$$|\Sigma_{k=1}^{N}|\tilde{b}_k||^2 \le E \quad (13)$$

It should be noted that in practice the regulator may enforce EIRP in several ways. Equation (13) may apply for enforcing EIRP using radiated measurements in which the regulator measures the EIRP over the air, and provides for an upper limit on possible EIRP for a given beamforming vector.

According to embodiments of the invention, the beamforming design problem with this simplified EIRP constraint combined with per-antenna constraints allows taking the beamforming phases as minus the corresponding channel phases, or keep the original phases of the initial beamforming vector unchanged, if transmitter 110 obtains an initial beamforming vector from receiver 140, as indicated in block 520, similar to the case of per-antenna constraints combined with total power constraint described above. Likewise, only the absolute values vector b has to be optimized.

According to embodiments of the present invention the substantially optimal beamforming vector b may be obtained using the method as described herein below.

In block 530 the antennas are ordered in decreasing order of their channel magnitudes. Let τ be a permutation on $\{1, \ldots, N\}$ such that:

$$h_{\tau(1)} \ge h_{\tau(2)} \ge \ldots \ge h_{\tau(N)}, \quad (14)$$

As before, there may be no need to actually find this permutation; it is only presented here for notational convenience. In block 540 a maximum integer M may be found such that the max full power inequality is fulfilled:

$$\Sigma_{k=1}^{M}\sqrt{p_{\tau(k)}} \le \sqrt{E}, \quad (15)$$

In block 550 beamforming vector b is composed according to:

$$b_{\tau(k)} := \begin{cases} \sqrt{p_{\tau(k)}} & k \in \{1, \ldots, M\}, \\ \sqrt{E} - \sum_{i=1}^{M}\sqrt{p_{\tau(i)}} & k = M+1 \le N \\ 0 & \text{otherwise} \end{cases} \quad (16)$$

Hence according to (16) beamforming vector has full per-antenna power on sorted channels 1 to M, the residual power allocated for sorted antenna M+1, while the remaining antennas get zero power.

Throughout the application this method will be referred to as the max full power+1 (MFP+1) method. According to embodiments of the present invention the beamforming vector obtained by MFP+1 method may be substantially optimal for the worst case EIRP constraint presented in (13).

It should be noted that while MFP+1 method may look similar to antenna selection, there may be a significant difference: according to MFP+1, a subset of the antennas may be chosen even if all antennas are connected to RF chains. MFP+1 method may be different form usual antenna selection methods, where there are less RF chains than antennas, and therefore some antenna subset must be chosen. For example, in case of several frequency bands, each having its own EIRP constraint. With MFP+1 method, in a high-EIRP band all antennas and all RF chains may be utilized, while in a low-EIRP band, only some of the antennas and the corresponding RF chains may be utilized.

It can be shown by examples that SNR obtained by MFP+1 method may be considerably higher than that of using known in the art methods, e.g., FPAP+scaling down to meet the EIRP constraint. Hence the MFP+1 method of embodiments of the current invention provides good tradeoff between performance and complexity, exhibiting nearly optimal performances in comparison to convex optimizations solutions, at the cost of a minor increase in complexity comparing to existing scaling methods.

According to a second type of EIRP constraint that may be used by the regulator, the measurement may be done in conducted mode. Here the regulator assumes that the EIRP is E=P*G*Y, where P is the total used power summed on all antenna ports, G is the assumed antenna gain, and Y is the beamforming gain, which may be defined by the regulator to be Y=N, with N the number of used antennas to which non-zero power is allocated. Since E may be set by the regulator, and G may be a system parameter, it follows that the larger the N is, the less power may be used.

One option to meet this constraint is to use MRC method with appropriate scaling, e.g. calculate MRC with a total power constraint of P=E/G/N, and then scale the beamforming vector such that the largest antenna power may be below the per antenna constraint. According to embodiments of the invention, another option to meet this constraint may be the MFP method. According to MFP method the first M antennas may be allocated in the same way as in the MFP+1, but zero power may be assigned to all other antennas. Since with the MFP not all available power may be used, MFP method may not be optimal. For some channel realizations MFP method may be better than the MRC+scaling, while for other realizations MFP method may be worse. According to embodiments of the invention, transmitter 110 may check both options, MFP or MRC+scaling, and may choose the one resulting in the largest SNR.

Figure 6:
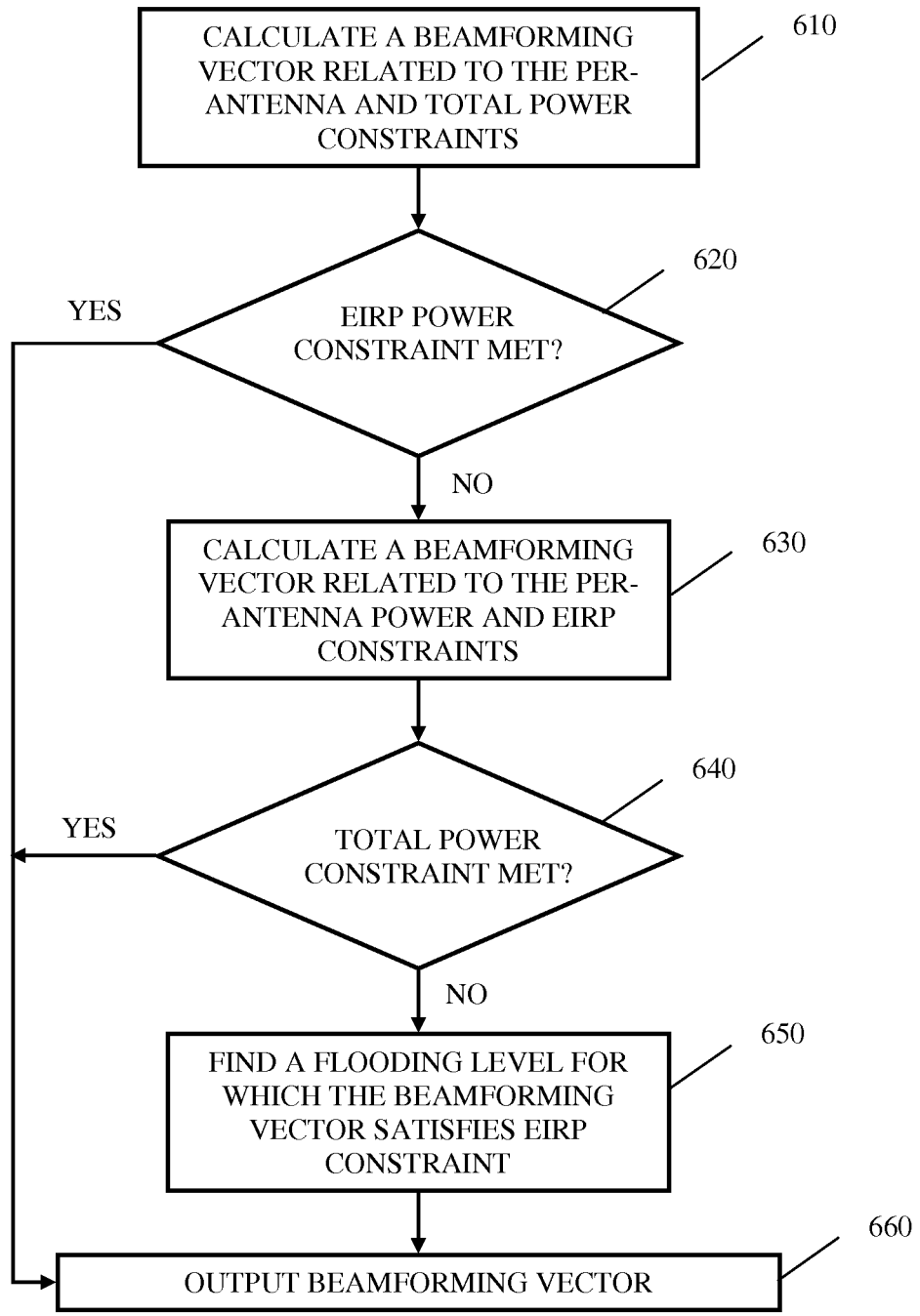
FIG. 6 is a flowchart illustration of the water flooding method for calculating beamforming vector under a combination of per-antenna, total power and EIRP constraints according to embodiments of the present invention.

Reference is now made to FIG. 6 which is a flowchart illustration of the water flooding method for calculating beamforming vector under a combination of per-antenna, total power and EIRP constraints according to embodiments of the present invention. According to embodiments of the present invention, a beamforming vector may be found, considering two of the three constraints, typically the per-antenna power constraints combined with either the total power constraint or the EIRP constraint. Then the channel vector may be modified by "water flooding" until the third constraint is also satisfied. Here, water flooding means replacing channel magnitude vector h by a new flooded channel vector $(h-\lambda)^+$, where λ is a non-negative real scalar. λ may be referred to as the flooding level throughout the application. Flooded channel vector $(h-\lambda)^+$ may be derived by subtracting λ from components of channel vector h that are larger than λ while reducing to zero components of channel vector h that are not larger than λ.

For example, the beamforming design method under only the per-antenna and total power constraints may be one of the above ratio threshold or iterative MRC methods. Similarly, the optional beamforming design method under only the per-antenna and EIRP power constraints may be the MFP+1 method.

Similarly to ratio threshold, iterative MRC and MFP+1 methods, the water flooding method considers only the absolute value channel vector h and absolute value beamforming b, and the final beamforming vector may be obtained by multiplying the $k^{th}$ entry of the output b by $\exp(-i \arg(\tilde{h}_k))$ for all k, where $\tilde{h}$ is the complex channel vector.

In detail, the water flooding method works as follows. At block 610 a beamforming vector $b_{per\text{-}ant.+tot.power}(h;P,p)$ related to the per-antenna and total power constraints may be found, e.g., by using the ratio threshold or iterative MRC methods. As indicated in block 620, if beamforming vector $b_{per\text{-}ant.+tot.power}(h;P,p)$ satisfies EIRP constraint or simplified EIRP constraint as presented in (13), then beamforming vector $b_{per\text{-}ant.+tot.power}(h;P,p)$ may be the output of the method. Otherwise, a beamforming vector $b_{per\text{-}ant.+EIRP}(h;E,p)$ related to the per-antenna power and overall EIRP constraints may be found, e.g., by using the MFP+1 method, as indicated in block 630. As indicated in block 640, if beamforming vector $b_{per\text{-}ant.+EIRP}(h;E,p)$ satisfies the total power constraint, then beamforming vector $b_{per\text{-}ant.+EIRP}(h;E,p)$ may be the output of the method, as indicated in block 660. It should be noted that blocks 630 and 640 are optional. At block 650 a flooding level $\lambda>0$ may be found, for which beamforming vector $b_{per\text{-}ant.+tot.power}((h-\lambda)^+;P,p)$ satisfies the simplified EIRP constraint (13) with nearly equality:

$$|\{\Sigma_{k=1}^{N}[b_{per\text{-}ant.+tot.power}((h-\lambda)^+;P,p)]_k\} - \sqrt{E}| < \epsilon, \quad (17)$$

where $\epsilon$ is the allowed error.

Thus, $b_{per\text{-}ant.+tot.power}((h-\lambda)^+;P,p)$ may be the output of the water flooding method, as indicated in block 660.

Note that since $\Sigma_{k=1}^{N}[b_{per\text{-}ant.+tot.power}((h-\lambda)^+;P,p)]_k$ may be a decreasing function of the flooding level $\lambda$, finding flooding level may be performed efficiently by a binary search.

Figure 7:
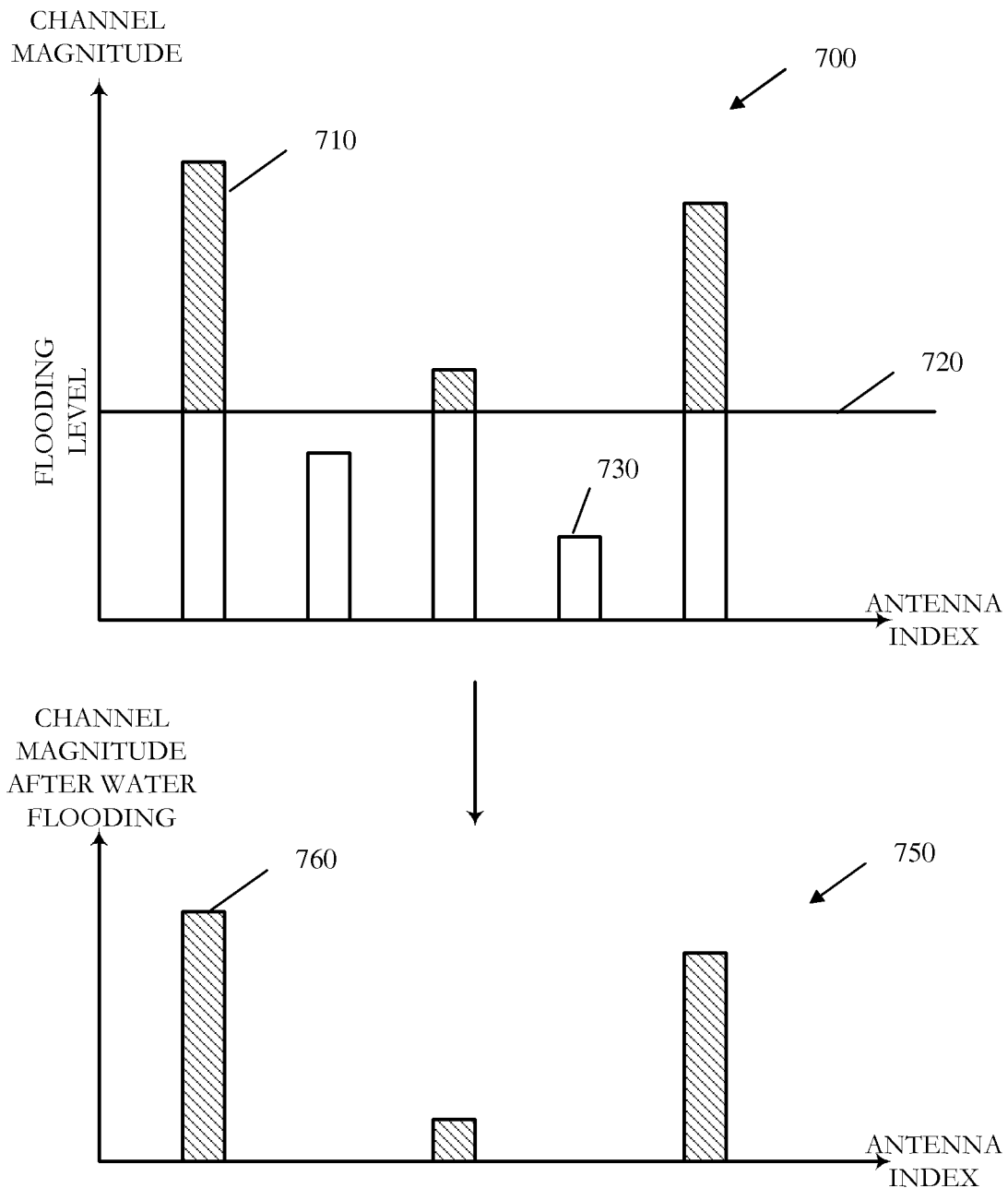
FIG. 7 schematically illustrates channel vector h before and after water flooding according to embodiments of the present invention.

Reference is made to FIG. 7, which schematically illustrates channel vector h before 700 and after 750 water flooding according to embodiments of the present invention. According to embodiments of the present invention, components of channel vector h that are larger than $\lambda$, such as component 710 may be reduced by $\lambda$ as a result of water flooding, the resultant component is illustrated in FIG. 7 as component 760, while components of channel vector h that are smaller than $\lambda$, such as component 730, may be reduced to substantially zero.

Figure 8:
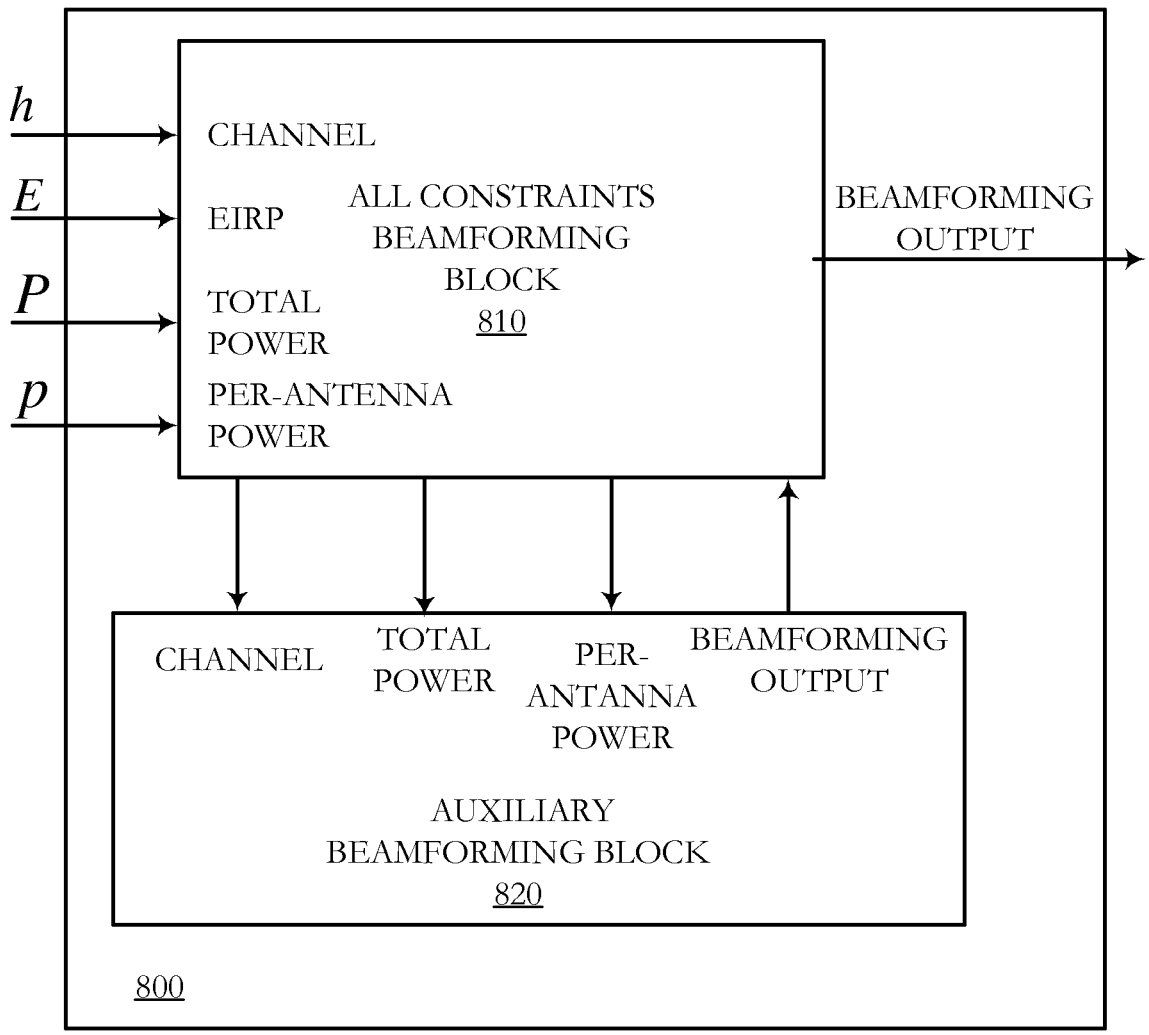
FIG. 8 schematically illustrates another exemplary implementation of beamforming module according to embodiments of the present invention.

Reference is made to FIG. 8, which schematically illustrates another exemplary implementation of beamforming module 800 according to embodiments of the present invention. According to embodiments of the present invention beamforming module 800 may include all constraint beamforming block 810 and auxiliary beamforming block 820. Beamforming module 800 may be implemented in transmitter 110 as transmitter beamforming module 112 or in receiver 140 as receiver beamforming module 142. Auxiliary beamforming block 820 may be implemented, for example, using beamforming block 310 and MRC block 320 as presented in FIG. 3. All constraint beamforming block 810 may obtain channel vector h, total power constraint P, EIRP constraint E, and per-antenna power constraint vector p, as inputs and may output beamforming vector $b_{per\text{-}ant.+tot.power}((h-\lambda)^+;P,p)$.

According to embodiments of the present invention, beamforming module 112 may be adapted to perform the water flooding method. Auxiliary beamforming block 820 may obtain flooded channel vector $(h-\lambda)^+$ for some initial flooding level $\lambda'$, for example, $\lambda'=0$, total power constraint P, and per-antenna power constraint vector p, from all constraint beamforming block 810 and may return beamforming vector $b_{per\text{-}ant.+tot.power}((h-\lambda')^+;P,p)$. All constraint beamforming block 810 may verify whether beamforming vector $b_{per\text{-}ant.+tot.power}((h-\lambda')^+;P,p)$ satisfies EIRP constraint as presented in (13). If $b_{per\text{-}ant.+tot.power}((h-\lambda')^+;P,p)$ satisfies EIRP constraint then beamforming output may equal $b_{per\text{-}ant.+tot.power}((h-\lambda')^+;P,p)$. Otherwise, all constraint beamforming block 810 may continue to search for a flooding level $\lambda>0$, for which output beamforming vector $b_{per\text{-}ant.+tot.power}((h-\lambda)^+;P,p)$ satisfies the simplified EIRP constraint (13) with nearly equality in (17). For each examined flooding level, all constraints beamforming block 810 may obtain $b_{per\text{-}ant.+tot.power}((h-\lambda)^+;P,p)$ from auxiliary beamforming block 820 by letting the channel input of block 820 be equal to $(h-\lambda')^+$.

Embodiments of the present invention may be adapted perform with a single antenna or multi-antenna receiver. In the case of a multi-antenna receiver, transmitter 110 may assume a RX beamforming vector in receiver 140. Composition of this RX beamforming vector and the channel matrix may result in an equivalent single-RX antenna channel vector. Hence, transmitter 110 may use any of the beamforming methods of embodiments of the present invention with the equivalent channel vector.

For example, transmitter 110 may consider only one of antennas 148 of receiver 140, e.g., the antenna corresponding to the largest-norm row in the channel matrix. It should be noted that considering only one of antennas 148 of receiver 140 may be equivalent to assuming that receiver 140 is using a standard unit vector for beamforming. The equivalent single-RX antenna channel vector may be the selected row of the channel matrix. Alternatively, transmitter 110 may assume that receiver 140 is using max-eigenmode beamforming. Multiplying the channel matrix from the left by the RX max-eigenmode beamforming vector results in a single row vector, and this row vector may be the equivalent single-RX antenna channel vector.

Alternatively, the effective single-RX-antenna channel may be obtained by an explicit beamforming feedback from the receiver 140, such as in the case of IEEE 802.11n/ac explicit matrix feedback. For example, if some columns of the "V"-part of the singular value decomposition (SVD) of the channel matrix are returned by receiver 140, then the column corresponding to the maximum eigenmode may be used as the effective channel. Generally, if receiver 140 returns any explicit TX-beamforming vector, then the conjugate vector may serve as an approximated single-antenna channel for the current algorithms.

According to embodiments of the present invention, in explicit beamforming, the channel may be sounded such that the full dimensions of the beamforming matrix can be extracted by receiver 140 and fed back to transmitter 110. For example, if both transmitter 110 and receiver 140 are n times n devices having n transmit and receive antennas, transmitter 110 may send a sounding frame to receiver 140 from which a beamforming matrix that may have dimensions of n times n, typically the V matrix of the SVD of the channel, may be extracted and feedback to transmitter 110. Alternatively, in case transmitter 110 decides to transmit a single spatial stream, transmitter 110 may use only the first row of the beamforming matrix. This first row may be the single stream beamforming vector used as the initial beamforming vector, under the assumption that this first row is a MRC of the effective single stream channel vector.

Since embodiments of the present invention may manipulate the first row of the beamforming matrix, one of ordinary skill in the art would expect that if receiver 140 implements beamforming calculations according to embodiments of the current invention, receiver 140 needs to manipulate just the first row of the beamforming matrix before feeding back the full beamforming matrix. However, this may not be the case.

Since embodiments of the invention described herein may be used mainly for single stream operation with a single effective receiver antenna 148, manipulating just the first row of the beamforming matrix may distort the matrix in case it is used for transmitting multi streams, in which case transmitter 110 may use number of rows that corresponds to the number of spatial streams. So receiver 140 may need to know in advance if transmitter 110 uses just a single spatial stream, in which case feedback the first row of the beamforming matrix, manipulated according to embodiments of the present invention, for example ratio threshold method, iterative MRC method, MFP+1 etc. Alternatively, receiver 140 may decide for transmitter 110 that transmitter 110 will use a single spatial stream, in which case receiver 140 again may send back the manipulated first row of the beamforming matrix, thus forcing transmitter 110 to use a single spatial stream.

According to embodiments of the invention, receiver 140 may send a single row of the beamforming matrix, manipulated according to embodiments of the present invention, for example ratio threshold method, iterative MRC method, MFP+1 etc. in case a single spatial stream is to be used, and another matrix, e.g. the SVD matrix, having a larger dimension, in case more than one spatial stream is needed. Receiver 140 may either decide on the number of spatial streams or get an indication of this from transmitter 110.

According to embodiments of the invention, there may be iterations between transmitter beamforming and estimate of receiver beamforming. For example, if transmitter 110 has an estimation of the channel matrix, then transmitter 110 may calculate the transmitter beamforming vector according to embodiments of the present invention using the first column of V from the SVD as the input effective channel vector. The result may be a first-step transmitter beamforming vector. Based on this first-step transmitter beamforming vector, transmitter 110 may calculate a new estimate of receiver beamforming vector e.g., by performing MRC on the effective channel Finding a new estimate of receiver beamforming vector may give a new effective channel vector in transmitter 110 side, and hence a second-step transmitter beamforming vector. Transmitter 110 may proceed this way until some stopping criterion is met, e.g., a pre-defined maximum number of iterations is reached, and output the final transmitter beamforming vector.

According to embodiments of the invention, there may be iterations between transmitter 110 and receiver 140. Iterations between transmitter 110 and receiver 140 may be mainly relevant in case of explicit beamforming. This may be done by applying the beamforming vector of according to embodiments of the invention to the sounding frame that may be sent to receiver 140 and used to enable receiver 140 to generate a feedback matrix. By doing that receiver 140 may experience a new effective channel to which receiver 140 may design a new effective channel vector, for example, the optimal MRC vector. Transmitter 110 may receive said feedback matrix comprising new effective channel vector and calculate an updated transmitter beamforming vector. This way the iterations may be done seamlessly without any extra overhead or complexity. However, every sounding frame may have to use the last calculated beamforming vector as a beamforming vector, in contrary to the current art according to which usually sounding frames are sent without beamforming. Optionally, only the amplitudes of the beamforming vectors calculated according to embodiments of the current invention should scale the sounding frame, such that the original phases of the sounding frame are not changed.

Calculating beamforming vectors according to embodiments of the invention may be useful also in multi-carrier systems, such as frequency-division multiplexing (FDM) or OFDM as well as other multi-carrier systems.

Figure 9:
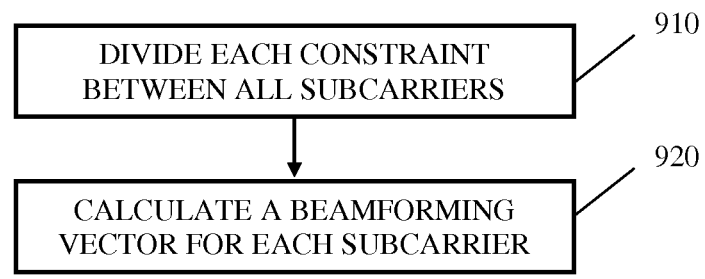
FIG. 9 is a flowchart illustration of the per-bin method for calculating beamforming vectors in multi-carrier systems according to embodiments of the present invention.

Reference is now made to FIG. 9 which is a flowchart illustration of the per-bin method for calculating beamforming vectors in multi-carrier systems according to embodiments of the present invention. According to embodiments of the present invention each subcarrier, also referred to as bin, may be regarded as a separate channel and methods of embodiments of the current invention may be applied separately in each bin. As indicated in block 910 the constraints may be divided between the subcarriers. For example, the per-antenna power constraints, the total power constraint and the EIRP constraint may be divided between the subcarriers. For example, if the total power constraint is 1 W and there are 100 subcarriers, then the total power in each subcarrier may not exceed $\frac{1}{100}$ W. A beamforming vector may be calculated for each subcarrier, as indicated in block 920. While this method is not optimal, it is considerably simpler than the existing near-optimal methods, and gives a considerable SNR improvement over the simple MRC/FPAP+scaling methods.

Figure 10:
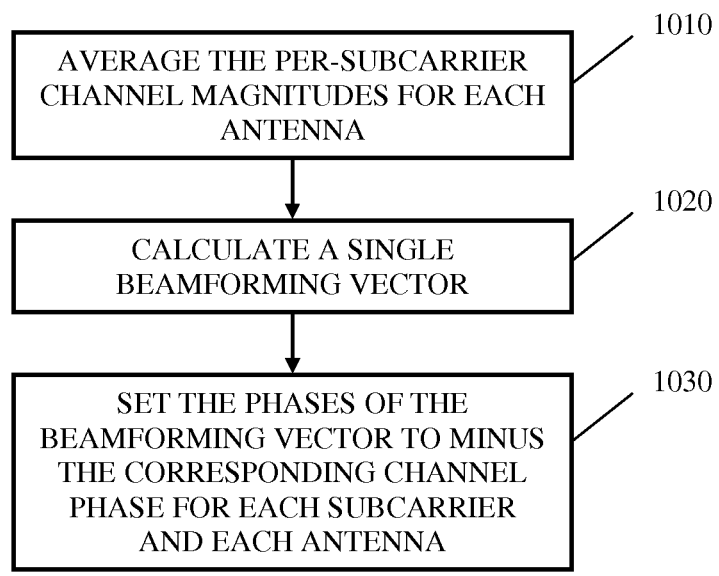
FIG. 10 is a flowchart illustration of a single vector method for calculating beamforming vector in multi-carrier systems according to embodiments of the present invention.

Reference is now made to FIG. 10 which is a flowchart illustration of a single vector method for calculating beamforming vector in multi-carrier systems according to embodiments of the present invention. According to embodiments of the present invention a further simplification may be obtained by designing a single vector of beamforming magnitudes for all subcarriers with possibly using minus the channel phase for each subcarrier and each antenna. As indicated in block 1010 the per-subcarrier channel magnitudes for each antenna are averaged. This vector of averages may be used as the input channel vector to any of the beamforming methods according to embodiments of the present invention, beamforming vector may be calculated, as indicated in block 1020. The output beamforming vector may be taken as the absolute value of the beamforming vector in all subcarriers, for example, by letting the absolute values of the entries of the beamforming vectors at all subcarrier s be equal to the output beamforming vector divided by $\sqrt{F}$ where F is the number of sub-carriers. Alternatively, the power constraints inputs may be scaled prior to calculating a beamforming vector for the vector of averages according to embodiments of the present invention. For example, per-antenna constraints may be scaled to be p/F, total power constraint may be scaled to be P/F and EIRP power constraint may be scaled to be E/F. If the power constraints are scaled prior to calculating the beamforming vector then the output beamforming vector may be used as the absolute-value part of the beamforming vector of each subcarrier. As indicated in block 1030 the phases of the beamforming vector may be set to minus the corresponding channel phase for each subcarrier and each antenna. Alternatively, if transmitter 110 obtains initial beamforming vectors from receiver 140, then the original phases of the initial beamforming vectors may be left unchanged for each subcarrier and each antenna.

For example, if there are F subcarriers and $\{\tilde{h}_{k,s}\}$ is the antenna-by-subcarrier complex channel matrix, then the beamforming design methods according to embodiments of the present invention may get the per-antenna vector $$\left\{ \sqrt{\frac{1}{F} \sum_{s=1}^{F} |\tilde{h}_{k,s}|^2} \right\}_{k \in \{1, \ldots, N\}} \quad (18)$$

It should be readily understood by those skilled in the art that this is only one of many possible ways to average the channel magnitudes over subcarriers and that many other ways may be suitable.

According to embodiments of the present invention in channels where there is small variance in the amplitude of the different frequency bins, the SNR achieved by the single vector method may be similar to that of the per-bin method, with a considerable complexity reduction.

Figure 11:
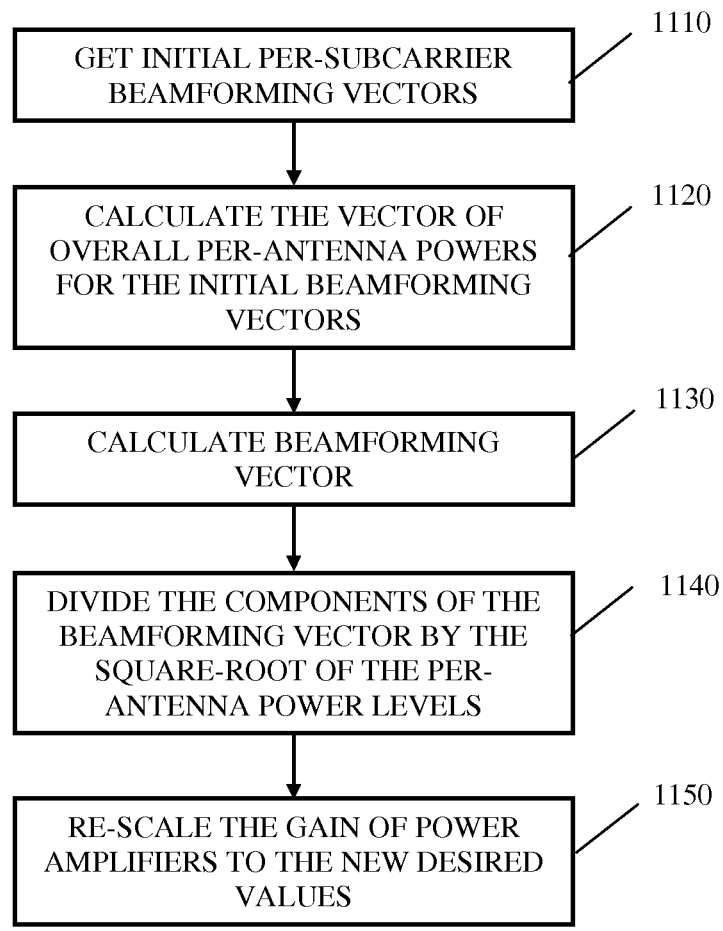
FIG. 11 which is a flowchart illustration of a per antenna correction method according to embodiments of the present invention.

Reference is now made to FIG. 11 which is a flowchart illustration of a per antenna correction method according to embodiments of the present invention. According to embodiments of the present invention, as indicated in block 1110 the transmitter may have some initial transmitter beamforming vectors, e.g., those returned from the receiver through explicit feedback, typically accounting only for the overall power constraint. In such an application, the absolute value outputs $\{b_i\}$ of beamforming methods according to embodiments of the invention may be divided by the square-root of the known initial per-antenna power, as indicated in block 1140, and the result may be used to re-scale the gain applied to the signal of the antennas by changing the analog or digital gains of each transmit antenna, as indicated in block 1150. In such an application, Initial beamforming vectors per-subcarrier may be obtained, as indicated in block 1110, and total per-antenna powers $\{\tilde{p}_i\}$ may be calculated, as indicated in block 1120. In block 1130 beamforming vector $\{b_i\}$ may be calculated according to embodiments of the present invention, for example using the single vector $\{\sqrt{\tilde{p}_i}\}$ as the input channel. Such that $h_i = \{\sqrt{\tilde{p}_i}\}$ for all i. In block 1140 the components of the beamforming vector $\{b^i\}$ may be divided by the square-root of the per-antenna power levels $\{\tilde{p}_i\}$. In block 1150 the gain of the i-th antenna may be multiplied by $b_i/\sqrt{\tilde{p}_i}$, for all i. It should be readily understood by those skilled in the art that the intermediate stage of dividing the beamforming vector $\{b_i\}$ by the square-root of the per-antenna power levels $\{\sqrt{\tilde{p}_i}\}$ is optional, as it may not be necessary to actually go through this intermediate calculation for eventually multiplying the gain of the i-th antenna by $b_i/\sqrt{\tilde{p}_i}$. For example, the gain may first be multiplied by $b_i$ and then divided by $\sqrt{\tilde{p}_i}$.

According to embodiments of the present invention, this scaling may be applied by making an appropriate gain change to analog power amplifiers 116 of transmitter 110. This may be implemented, for example by setting the appropriate registers of a variable gain amplifier (VGA). In this way the correction may be done substantially in the analog domain and does not necessitate the change of the digital beamforming matrices values. Alternatively, the digital signal in either the time or frequency domains may be scaled.

According to embodiments of the present invention, the per antenna correction method which may scale the power of each antenna, may be applied for multi stream transmission as well. However, contrary to the case of single stream, per antenna correction method may not be optimal for multi stream transmission and in general improved performance may not be guarantied in comparison to using SVD+scaling. Where SVD+scaling refers to using columns of V from an SVD matrix as beamforming vectors, and multiplying these beamforming vectors by a single scaling factor for meeting all constraints. According to the per antenna correction method, the vector of per antenna power may be computed for the case of using several spatial streams by, for example, summing the streams in each antenna. The resultant vector of per antenna power may be used as an input to beamforming methods according to embodiments of the present invention. The output beamforming vector b may be used to scale each antenna. While distorting the original matrices, this operation might be beneficial in certain channel scenarios in comparison with the SVD+scaling method where scaling is done evenly on all antennas.

According to embodiments of the present invention, blocks 1130 and 1140 may be optional, in case of only per antenna constrains. As already mentioned, in a typical OFDM applications, the transmitter may already have some initial transmitter beamforming vectors, e.g., those returned from the receiver through explicit feedback, typically accounting only for the overall power constraint. In such an application, the vector $\{\tilde{p}_i\}$ of overall per-antenna power may be calculated for the default transmitter beamforming vectors. Additionally the maximum per-antenna power, $\{p_i\}$ may be known. In this case the initial power of the i-th PA may be scaled by the maximum possible output power of the i-th PA, $p_i$, divided by the corresponding component $\tilde{p}_i$ of overall per-antenna power (for all i). It should be noted that the maximum per-antenna power vector, $\{p_i\}$, may be modulation coding scheme (MCS) dependent.

In practical applications the transmitter may work in the following way: The digital hardware portions of the transmitter may be ignorant of any change and may continue using the default beamforming vectors and for all transmission chain i, the analog power gain of transmission chain i may be re-scaled, that is, multiplied by a factor of $p_i/\tilde{p}_i$, so that the output power reaches the maximum value of $p_i$. Alternatively, the re-scaling by factor $p_i/\tilde{p}_i$ can be applied digitally on the time domain signal for each chain, which avoids the need to re-scale the beamforming vector in each OFDM bin.

According to embodiments of the invention the hardware (HW)/software (SW) utilization may be optimized by configuring the hardware portion of beamforming module 112 to calculate the following information: The overall power of each antenna for each possible number of TX streams, when using the initial beamforming vectors. For example, if the explicit sounding frame includes initial beamforming information for two streams and the transmitter has 4 antennas, it may be desirable to get from the hardware two vectors of length 4: A vector of powers for 4 antennas assuming a single stream is used, A vector of powers for 4 antennas assuming two streams are used. Optionally, for each number of streams, it would be desirable to get the vector of inverse per-antenna powers $\{1/\tilde{p}_i\}$.

This HW/SW partitioning is useful, as it enables HW acceleration to generate the per-antenna power vector, which includes all information required for the software to obtain the re-scaling coefficients.

Alternatively instead of automatically returning all possible vectors of powers for any possible choice of the number of streams, the hardware may get the required number of streams as an input, and return the vector of powers only for the specified number of streams.

In a typical application, together with the initial beamforming transmitter 110 may also obtain the corresponding SNR-estimation, $SNR_{old}$. For example, in the 802.11n explicit feedback exchange, a per stream SNR metric is returned. After scaling the per-antenna power, it is possible to get an estimation $SNR_{new}$ for the post-change SNR by a constant c depending merely on the new beamforming vector $\{b_i\}$ and the per-antenna power levels $\{\tilde{p}_i\}$ of the initial per-antenna beamforming vector or antennas-by-subcarriers matrix. For example, after scaling the beamforming vectors by the factor $b_i/\sqrt{\tilde{p}_i}$ an estimation $SNR_{new}$ for the post-change SNR may be calculated according to the following formula:

$$\sqrt{\frac{SNR_{new}}{SNR_{old}}} = \frac{\sum_i b_i \cdot \sqrt{\tilde{p}_i}}{\sum_i \tilde{p}_i} \quad (19)$$

According to embodiments of the present invention the re-scaling of SNR formula may apply to any power allocation change operation, not only those described in this application. Which means that if the power allocation of the antennas is changed after an explicit feedback operation or implicit beamforming calculation that includes a per stream SNR report, this SNR report can be re-scaled using the above formula.

Embodiment of the present invention may provide new methods for the beamforming design problem under all the following constraints: per-antenna powers, overall power, and overall EIRP. These methods may enjoy the following desirable features: The resultant SNR may be typically considerably higher than that of the MRC/FPAP+scaling method. The complexity may typically be significantly smaller than that of standard convex optimization algorithms. The beamforming design block may be seen as modular, meaning that the block for all three constraints may be built from blocks assuming only two of the constraints, which, in turn, are based on the single-constraint MRC/FPAP blocks.

Some embodiments of the present invention may be implemented in software for execution by a processor-based system, for example, beamforming module 112. For example, embodiments of the present invention may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for producing a transmitter beamforming vector under per-antenna power constraints and an effective isotropic radiated power (EIRP) constraint for N antennas, the method comprising:
   assigning full antenna power to each antenna in a group of M antennas, wherein M<N and M is a maximal integer number of antennas for which the EIRP constraint is fulfilled when the group of said M antennas is transmitting at said per-antenna power constraints, and wherein the M antennas in the group have higher channel magnitudes than the antennas not included in the group; and
   assigning zero power to at least N−(M+1) antennas having the lowest channel magnitudes, said N−(M+1) antennas not being included in the group of M antennas.

2. The method of claim 1, further comprising setting phases of the transmitter beamforming vector to equal minus phases of the channel vector.

3. The method of claim 1, further comprising ordering said N antennas in decreasing order of their channel magnitudes, wherein said M antennas are the first M ordered antennas.

4. The method of claim 1, wherein the EIRP constraint is given by: $|\tau_{k=1}^N|\tilde{b}_k||^2 \le E$, where $\tilde{b}_k$ is the k-th component of the beamforming vector $\tilde{b}$ beamforming vector, wherein E denotes an EIRP limit.

5. The method according to claim 1, further comprising:
   assigning residual allowed power for meeting the EIRP constraint to an antenna M+1 being an antenna having highest magnitude of the antennas not belonging to the M antennas.

6. The method of claim 1, wherein the EIRP is given by: E=P*G*Y, where P is total used power summed on the antennas, G is assumed gains of the antennas, and Y is a beamforming gain.

7. The method according to claim 1, further comprising assigning zero power to antenna M+1 being an antenna having highest magnitude of the antennas not belonging to the M antennas.

8. The method of claim 7, wherein Y=M, the number of antennas allocated non-zero powers.

9. The method of 1, wherein signal to noise ratio (SNR) expected from using the method is compared to SNR from scaling an original BF vector such that EIRP limit is met, and choosing the set of beamforming vectors that achieves the highest SNR.

10. The method of claim 1, wherein the transmitter beamforming vector b(h;P,p) amplitudes are:

$$b_{\tau(k)} := \begin{cases} \sqrt{p_{\tau(k)}} & k \in \{1, \ldots, M\}, \\ \sqrt{E} - \sum_{i=1}^{M} \sqrt{p_{\tau(i)}} & k = M+1 \le N \\ 0 & \text{otherwise} \end{cases}$$

wherein $p_\tau$ are components of the per-antenna power constraints vector, E is the EIRP constraint, and $\tau$ is permutation on $\{1, \ldots, N\}$ such that $h_{\tau(1)} \ge h_{\tau(2)} \ge \ldots \ge h_{\tau(N)}$,
   wherein $h_x$ are absolute values of components of a channel vector h, and
   wherein antenna M+1 denotes an antenna having highest magnitude of the antennas not belonging to the M antennas.

11. The method of claim 1, adapted to be performed with a multi-antenna receiver, the method further comprising:
   obtaining an estimated channel matrix;
   assuming a receiver beamforming vector;

obtaining an equivalent channel vector by composing said receiver beamforming vector with the estimated channel matrix; and using said equivalent channel vector as said channel vector $\tilde{h}$.

12. The method of claim 11, the method further comprising:
calculating a new estimate of receiver beamforming vector based on said transmitter beamforming vector;
obtaining a new effective channel vector, based on said new estimate of receiver beamforming vector;
calculating a new transmitter beamforming vector based on said new effective channel vector; and
repeating the steps of calculating the new estimate, obtaining the new effective channel vector, and calculating the new transmitter beamforming vector until a stopping criterion is met.

13. The method of claim 1, adapted to be performed with a multi-antenna receiver, the method further comprising: obtaining a transmit beamforming matrix from receiver using explicit beamforming feedback; and using said transmit beamforming matrix as said channel vector $\tilde{h}$.

14. The method of claim 13, the method further comprising:
calculating an estimate of receiver beamforming vector based on said transmitter beamforming vector;
obtaining a new effective channel vector, based on said estimate of receiver beamforming vector;
calculating a new transmitter beamforming vector based on said new effective channel vector; and
repeating the steps of calculating the estimate, obtaining the new effective channel vector, and calculating the new transmitter beamforming vector until a stopping criterion is met.

15. The method of claim 1, adapted to be performed with multi-carrier systems, the method further comprising:
dividing said per-antenna power constraints and said EIRP between subcarriers; and
calculating said transmitter beamforming vector magnitude for each of said subcarriers.

16. The method of claim 1, adapted to be performed with multi-carrier systems, the method further comprising:
averaging per-subcarrier channel magnitudes for each antenna to obtain a vector of averages;
using said vector of averages as said channel vector magnitude; and
setting magnitudes of per-subcarrier beamforming vectors to equal the absolute value of said transmitter beamforming vector divided by the square-root of the total number of subcarriers.

17. The method of claim 1, further comprising:
obtaining initial beamforming vectors;
calculating power $\tilde{p}_i$ of antenna i resulting from the initial beamforming vectors, for all i; and
calculating said transmitter beamforming vector b based on channel magnitude vector being equal to $\{\sqrt{\tilde{p}_i}\}$.

18. The method according to claim 17, adapted to support multi stream transmission, wherein initial beamforming vectors are obtained per stream, calculating power $\tilde{p}_i$ of antenna i is done by summing the power of all streams in each antenna, and using input channel magnitudes equal to $\{\sqrt{\tilde{p}_i}\}$.

19. The method of claim 18, adapted to perform with a multi-antenna receiver, the method comprising:
sending a sounding frame to said multi-antenna receiver, said sounding frame using said scaled initial beamforming vector;
receiving a feedback matrix from said multi-antenna receiver, said feedback matrix comprising a new effective channel vector;
calculating an updated transmitter beamforming vector based on said new effective channel vector;
sending an updated sounding frame to said multi-antenna receiver, said updated sounding frame using said updated transmitter beamforming vector; and
repeating steps of receiving a feedback matrix, calculating the updated transmitter beamforming vector and sending said updated sounding frame until a stopping criterion is met.

20. The method of claim 1, adapted to be performed with multi-carrier systems, the method further comprising:
obtaining initial beamforming vectors for each subcarrier;
summing power levels over all said subcarriers for each antenna, to obtain power $\tilde{p}_i$ of said antenna i resulting from said initial beamforming vectors;
calculating per antenna the total beamforming vector magnitude by using $\sqrt{\tilde{p}_i}$ as channel vector magnitude; and
for each sub-carrier of antenna i, scaling the beamforming vector by $\sqrt{p_{\tau(i)}}/\sqrt{\tilde{p}_i}$,
wherein $p_{\tau(i)}$ is the per antenna power constraint, such that total allocated power per antenna allocated with non-zero power matches the per antenna power constraint.

21. The method of claim 20, adapted to support multi stream transmission, wherein initial beamforming vectors are obtained per stream and subcarrier, calculating power $\tilde{p}_i$ of antenna i is done by summing the power of all streams and subcarriers in each antenna, using input channel magnitudes equal to $\{\sqrt{\tilde{p}_i}\}$.

22. The method of claim 1, adapted to be performed with multi-carrier systems, the method further comprising:
obtaining initial beamforming vectors for each subcarrier;
summing power levels over all said subcarriers for each antenna, to obtain power $\tilde{p}_i$ of said antenna i resulting from said initial beamforming vectors;
calculating per antenna the total beamforming vector magnitude by using $\sqrt{\tilde{p}_i}$ as channel vector magnitude; and
scaling by $b_i/\sqrt{\tilde{p}_i}$ the i-th component of said initial beamforming vectors of said subcarriers for all said subcarrier and for all said antenna i, where bi are components of the transmitter beamforming vector.

23. The method of claim 1, further comprising:
obtaining a SNR-estimation, and
calculating an estimation of $SNR_{new}$ according to:

$$\sqrt{\frac{SNR_{new}}{SNR_{old}}} = \frac{\sum_i b_i \cdot \sqrt{\tilde{p}_i}}{\sum_i \tilde{p}_i}.$$

24. The method of claim 1, wherein: calculation of said transmitter beamforming vector is performed by a transmitter.

25. The method of claim 1, wherein: calculation of said transmitter beamforming vector is performed by a receiver and fed back to a transmitter.

26. The method of claim 1, wherein the per-antenna power constraints depend on modulation and coding scheme (MCS).

* * * * *